(12) United States Patent
Lee et al.

(10) Patent No.: US 11,731,227 B2
(45) Date of Patent: Aug. 22, 2023

(54) SPINDLE STRUCTURE

(71) Applicant: Agile Wing Smart Manufacturing Co., Ltd., Taichung (TW)

(72) Inventors: Hung-Wu Lee, Taichung (TW); Yong-Lin Chen, Taichung (TW); Yi-Hsuan Nien, Taichung (TW)

(73) Assignee: Agile Wing Smart Manufacturing Co., Ltd., Taichung (TW)

( * ) Notice: Subject to any disclaimer, the term of this patent is extended or adjusted under 35 U.S.C. 154(b) by 175 days.

(21) Appl. No.: 17/462,195

(22) Filed: Aug. 31, 2021

(65) Prior Publication Data

US 2022/0331920 A1 Oct. 20, 2022

(30) Foreign Application Priority Data

Apr. 14, 2021 (TW) .................. 110113390

(51) Int. Cl.
*B23Q 3/12* (2006.01)
*B23Q 39/04* (2006.01)
(Continued)

(52) U.S. Cl.
CPC ............ *B23Q 5/06* (2013.01); *B23B 31/4033* (2013.01); *B23C 1/045* (2013.01); *B23Q 3/12* (2013.01);
(Continued)

(58) Field of Classification Search
CPC . Y10T 409/309464; Y10T 408/36–385; B23B 31/4026; B23B 31/4033;
(Continued)

(56) References Cited

U.S. PATENT DOCUMENTS

| 2,749,806 A * | 6/1956 | Stephan ................. B23B 31/26 409/233 |
| 3,083,617 A * | 4/1963 | Swanson ................. B23Q 5/14 409/215 |
| 2013/0004257 A1 * | 1/2013 | Suzuki ................. B23B 31/265 409/233 |

FOREIGN PATENT DOCUMENTS

| CN | 112548600 A * | 3/2021 |
| DE | 4201013 A1 * | 7/1993 |

(Continued)

OTHER PUBLICATIONS

Machine Translation of DE 4201013-A1, which DE '013 was published Jul. 1993.*

*Primary Examiner* — Erica E Cadugan
(74) *Attorney, Agent, or Firm* — Alan D. Kamrath; Karin L. Williams; Mayer & Williams PC

(57) ABSTRACT

The present disclosure provides a spindle structure including a base, a spindle, a sliding member, a restoring mechanism, and a restriction member. The spindle is rotatably received in the base and forms a receiving room. An end of the receiving room is a blind end communicating exterior via a gas channel. The sliding member is slidably received in the receiving room, and two ends thereof are a piston and a driving portion respectively. A gas cavity is defined between the piston and the blind end. The sliding member tends to move toward the blind end due to the restoring mechanism. The restriction member is connected to the driving portion and radially deforms when the sliding member slides so as to fix or to release the tool-holder. The sliding member slides outward when the gas cavity is injected with gas via the gas channel.

15 Claims, 5 Drawing Sheets

(51) Int. Cl.
 *B23C 1/04* (2006.01)
 *B23B 31/26* (2006.01)
 *B23Q 5/06* (2006.01)
 *B23B 31/40* (2006.01)
 *B23Q 39/02* (2006.01)

(52) U.S. Cl.
 CPC .......... *B23Q 39/027* (2013.01); *B23B 31/265* (2013.01); *Y10T 409/308568* (2015.01); *Y10T 409/309464* (2015.01)

(58) Field of Classification Search
 CPC ................ B23B 31/265; B23B 31/261; B23B 39/16–39/24; B23Q 3/12; B23Q 39/00–39/048; B23C 1/04; B23C 1/08; B23C 1/10; B24B 27/0023; B27C 3/04; B27C 9/04
 USPC ....................................... 409/233; 408/31–53
 See application file for complete search history.

(56) References Cited

FOREIGN PATENT DOCUMENTS

JP 59-042234 A * 3/1984
TW I316442 B 11/2009

* cited by examiner

SPINDLE STRUCTURE

FIELD OF THE INVENTION

The present disclosure relates to a spindle structure, more especially to a spindle structure having a pneumatically-driven tool-holder releasing mechanism.

BACKGROUND OF THE INVENTION

A spindle is used to connect to a tool holder, and the tool holder is used to connect to a tool for processing. The tool is driven to rotate for processing by driving the spindle to rotate.

A common spindle has a hollow channel therein. The open end of the spindle is adapted for the tool holder to insert therein. The other end of the spindle is inserted with a slidable clamping mechanism. The clamping mechanism has movable or deformable clamps at the front end thereof to secure the tool holder. The clamps retract or open when the clamping mechanism slides axially. Thereby, the tool holder is secured or released.

Specifically, a driving mechanism is usually disposed on a rear end of the clamping mechanism to drive the clamping mechanism to move axially, as shown in patent TW 1316442. Thus, the spindle structure has a larger axial length, and it's difficult to reduce the size of the spindle. Besides, every spindle has to be disposed with such driving mechanism. Therefore, the machine tool having plural spindles becomes enormous.

Thus, it is critical to reduce the volume of the driving mechanism and to receive more tool holders.

The present invention is, therefore, arisen to obviate or at least mitigate the above mentioned disadvantages.

SUMMARY OF THE INVENTION

One of the objects of the present invention is to provide a spindle structure having a reduced size due to the pneumatically-driven tool-holder releasing mechanism arranged at a lateral side.

To achieve the above and other objects, the present invention provides a spindle structure including a base, at least one spindle body, at least one sliding member, at least one restoring mechanism, at least one restriction member, and a gas valve.

The base defines an axial direction. The at least one spindle body is received in the base and is rotatable in the base about the axial direction. The at least one spindle body is formed with at least receiving room. An end of the receiving room is a blind end and is formed with at least one gas channel. An opening of the at least one gas channel is formed on an outer face of the at least one spindle body and is defined as a gas inlet. An other end of the at least one receiving room is opened and is adapted for a tool holder to insert therein. The at least one sliding member is received in the at least one receiving room and is slidable along the axial direction. A piston and a driving portion are arranged at two ends of the at least one sliding member respectively. The piston is closer to the blind end of the receiving room than the driving portion is. A gas cavity is defined between the piston and the blind end of the receiving room. The gas cavity communicates the at least one gas channel. The at least one restoring mechanism is arranged in the receiving room and provides an elastic force to the sliding member in order to push the at least one sliding member to move toward the blind end of the at least one receiving room. The at least one restriction member is received in the at least one receiving room and is connected to the driving portion of the at least one sliding member. The at least one restriction member is adapted for connecting to the tool holder and selectively interferes the tool holder along the axial direction in order to prevent the tool holder from moving outward along the axial direction. The at least one restriction member is driven to deform between a fixation position and a release position by the at least one sliding member which is sliding along the axial direction so as to secure the tool holder or to release the tool holder selectively. The gas valve is disposed on the base and selectively communicates the gas inlet. The gas valve is adapted for connecting to a gas source in order to inject gas into the gas cavity via the gas channel so that the at least one sliding member is pushed to slide outward along the axial direction. Thereby, the at least one restriction member is driven to deform from the fixation position to the release position.

Therefore, the pneumatically-driven tool-holder releasing mechanism at the lateral side helps reduce the size of the spindle structure, and the spindle can connect two tool holders at the same time to improve the efficiency.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

The present disclosure can be more fully understood by reading the following detailed description of the embodiment, with reference made to the accompanying drawings as follows.

DETAILED DESCRIPTION OF THE PREFERRED EMBODIMENTS

Figure 1:
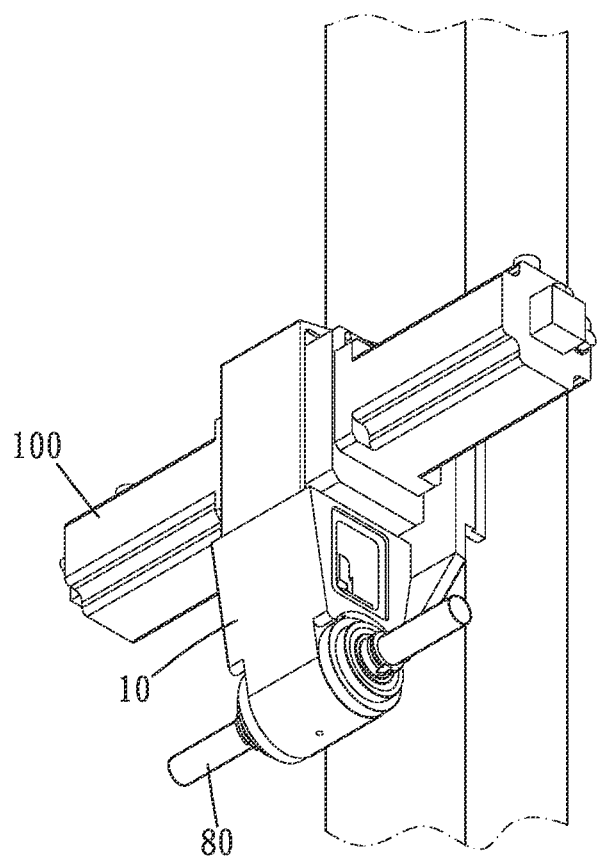
FIG. 1 is a stereogram of the present invention.
Figure 2:
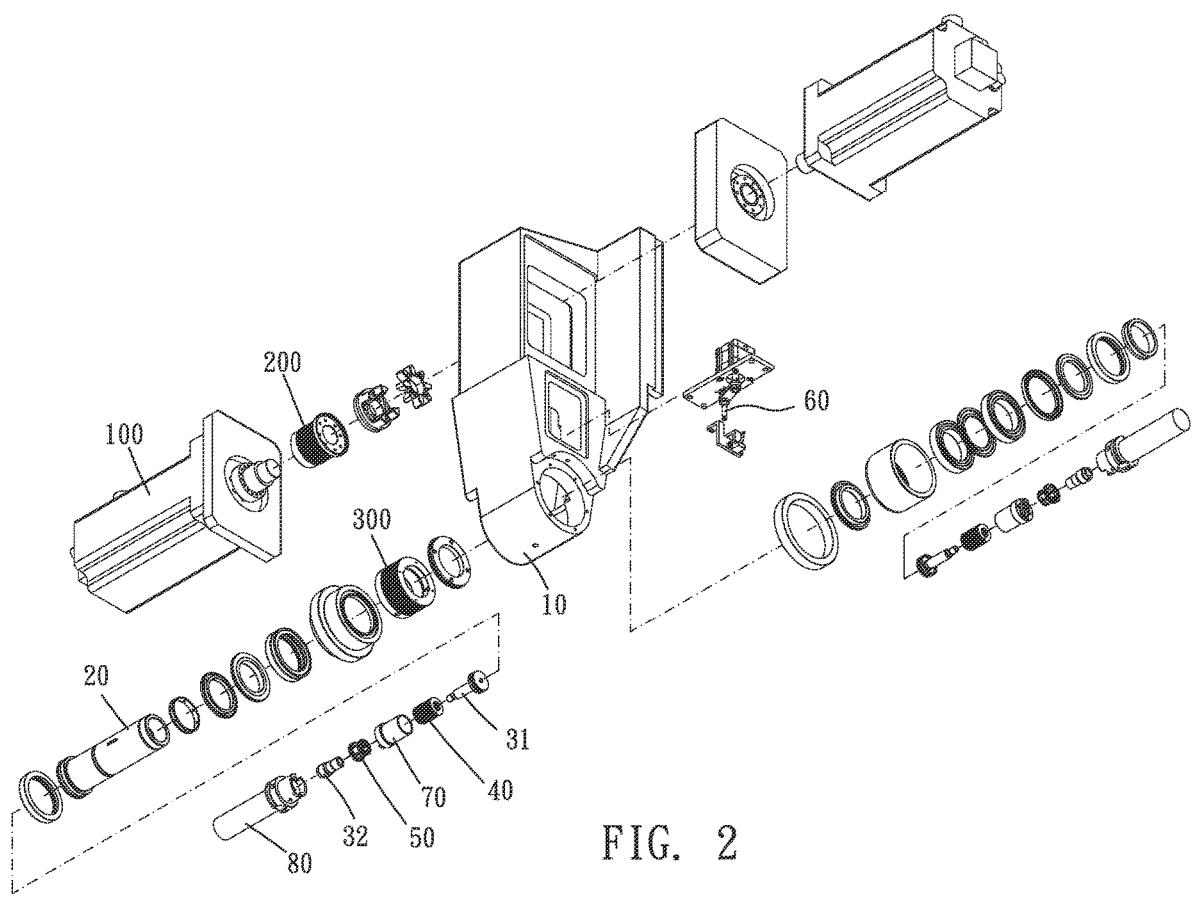
FIG. 2 is a breakdown drawing of the present invention.
Figure 3:
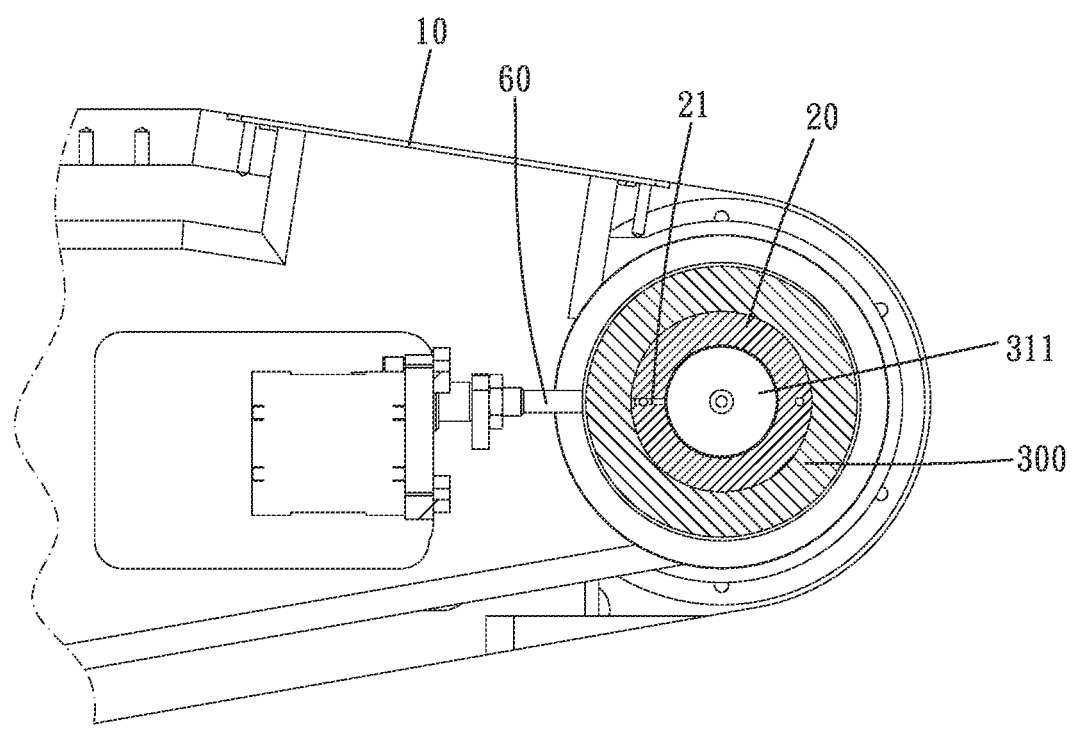
FIG. 3 is a partial cross-section drawing of the present invention.
Figure 4:
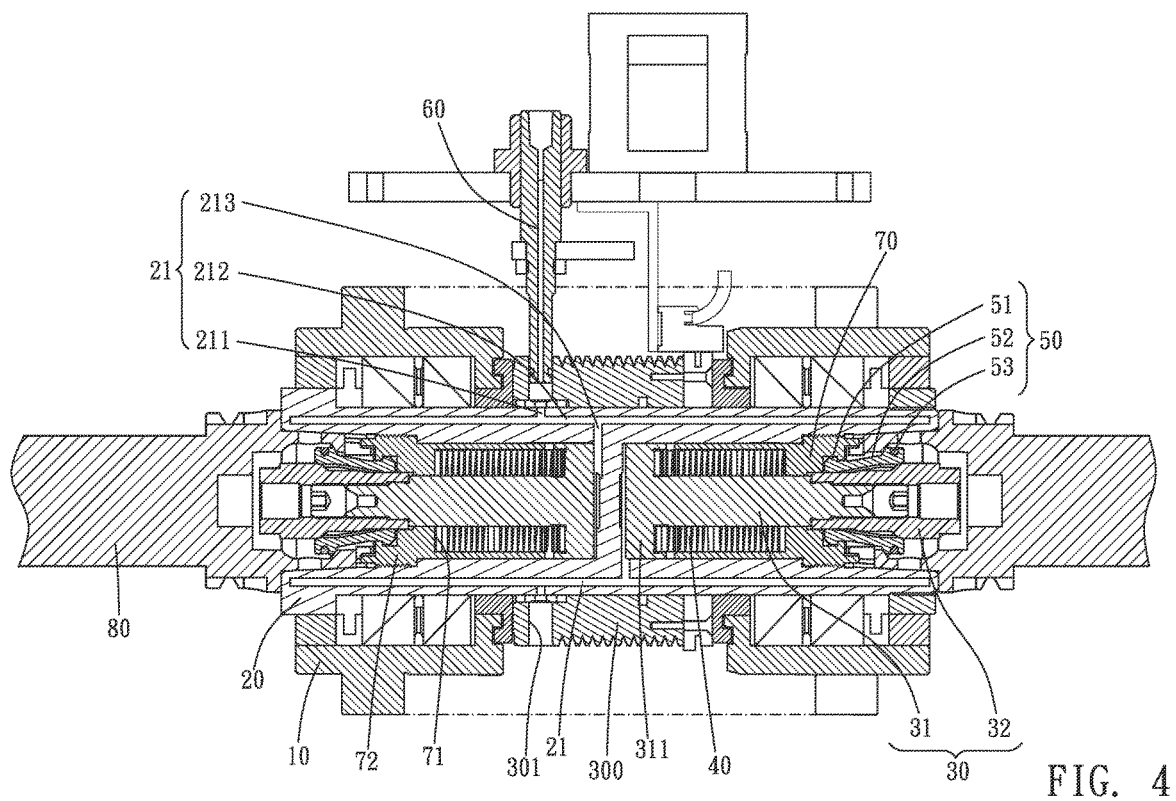
FIG. 4 is a cross-section drawing of the present invention at an other angle.
Figure 5:
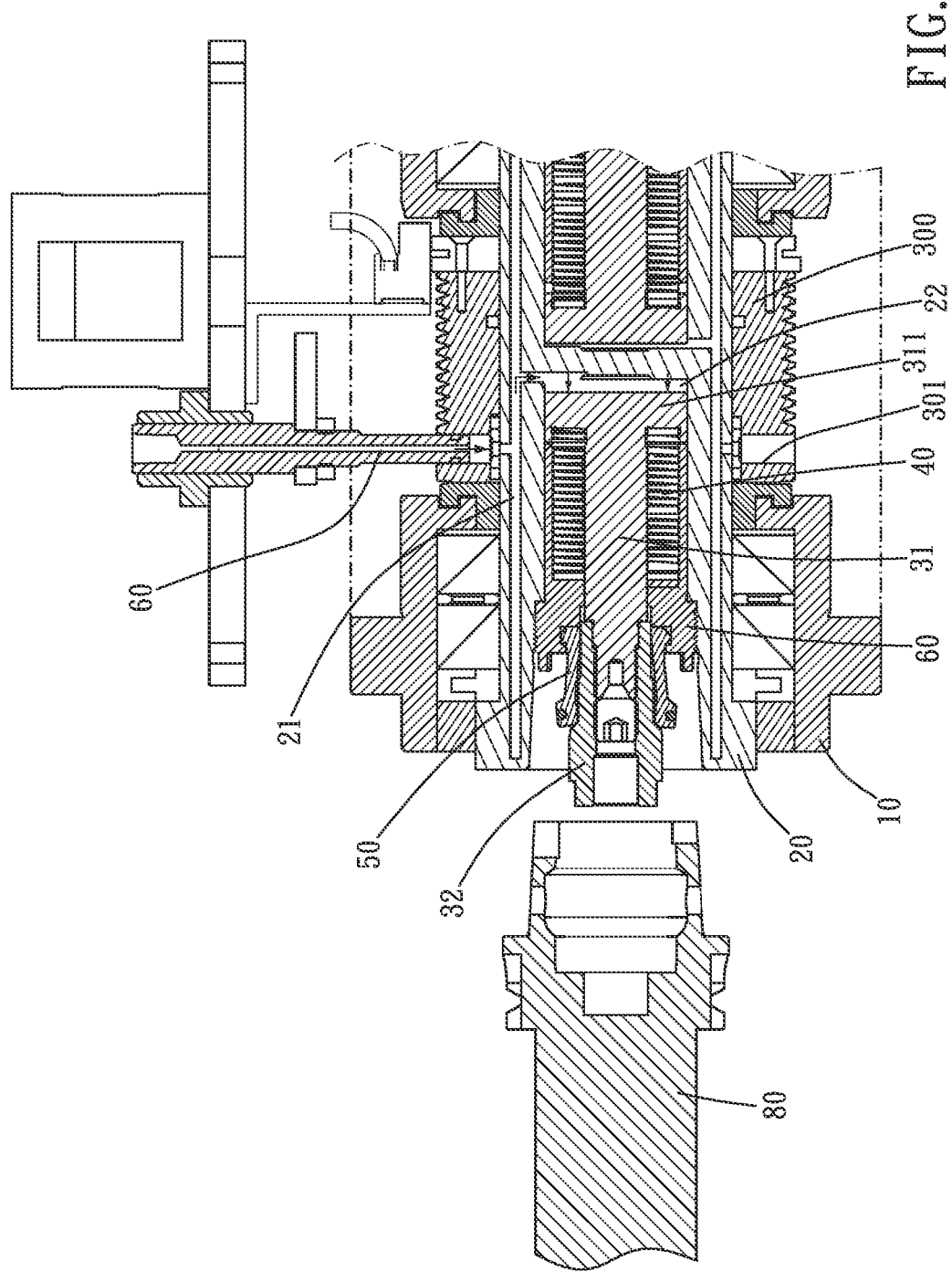
FIG. 5 is an illustration showing an operation of the present invention.

Please refer to FIG. 1 to FIG. 5, the present invention provides a spindle structure including a base 10, at least one spindle body 20, at least one sliding member 30, at least one restoring mechanism, at least one restriction member 50, and a gas valve 60. Preferably, a driving device 100, a first pulley 200, a second pulley 300, and a driving belt, which is not shown in the drawings, can be also included.

The base 10 defines an axial direction. In the present embodiment, the axial direction is parallel to a horizontal direction. The base 10 is formed with a receiving space. The at least one spindle body 20 is received in the receiving space of the base 10 and is rotatable about the axial direction. The at least one spindle body 20 is formed with at least one receiving room therein. An end of the receiving room is a blind end and is formed with at least one gas channel 21. An opening of the gas channel 21 formed on an outer face of the spindle body 20 is defined as a gas inlet. An opposite end of the receiving room is open for a tool holder 80 to insert therein. An opposite end of the tool holder 80 is adapted for connecting to tools for processing, such as grinding pads.

The at least one sliding member 30 is slidably received in the at least one receiving room to be slidable along the axial direction. Two ends of the at least one sliding member 30 has a piston 311 and a driving portion respectively. The piston 311 is closer to the blind end of the receiving room than the driving portion is. A gas cavity 22 is formed between the blind end and the piston 311. The gas cavity 22 communicates the gas channel 21. The restoring mechanism is arranged in the receiving room to provide an elastic force to the sliding member 30 so that the sliding member 30 tends to move toward the blind end of the receiving room. The at least one restriction member 50 is received in the receiving room and is connected to the driving portion of the sliding member 30. The restriction member 50 is adapted for connecting to the tool holder 80 and interferes the tool holder 80 along the axial direction to prevent the tool holder 80 from moving outward. The restriction member 50 is driven to deform radially between a fixation position and a release position by sliding member 30 which is axially sliding. Thereby, the tool holder 80 can be fixed or released.

The gas valve 60 is disposed on the base 10 and selectively communicates the gas inlet. The gas valve 60 is adapted for connecting to a gas source to inject gas into the gas cavity 22 via the gas channel 21 so as to drive the sliding member 30 to axially slide outward. Thereby, the restriction member 50 deforms from the fixation position to the release position.

In the present embodiment, the at least one spindle body 20 includes one said spindle body 20. The spindle body 20 is formed with two said receiving rooms at two ends thereof. The blind ends of the receiving rooms are closed to each other, and the two receiving rooms open toward opposite directions. Each of the receiving rooms has one said gas channel 21. The two gas channels 21 communicate the two receiving rooms respectively. Preferably, the gas inlets of the two gas channels 21 are spacedly arranged along a circumferential direction of the spindle body 20. Each of the gas channels 21 includes a first radial section 211, an axial section 212, and a second radial section 213. The axial section 212 connects the first radial section 211 and the second radial section 213 therebetween. The first radial section 211 is connected to the gas inlet, and the second radial section 213 is connected to the gas cavity 22. Therefore, one of the gas inlets can be directed to the gas valve 60 when rotating the spindle body 20. In the present embodiment, the structure of the first radial section, the axial direction, and the second radial section is designed to facilitate processing, not to restrict the structure of the gas channel. Besides, the at least one sliding member 30 includes two said sliding member 30. The at least one restoring mechanism includes two said restoring mechanism. The at least one restriction member 50 includes two said restriction member 50. Specifically, each of the sliding member 30 includes a piston member 31 and a blocking or driving member 32. The piston member 31 and the blocking member 32 are connected together. The piston 311 is located at an end of the piston member 31 remote from the blocking member 32. The blocking or driving member 32 has said driving portion. The outer diameter of the blocking member 32 reduces from an end remote from the piston member 31 toward an end closer to the piston member 31. An abutting member 70 is sleeved onto the piston member 31. The outer face of the abutting member 70 is fixed to the inner wall of the receiving room. Two ends of the abutting member 70 is formed with a spring room 71 and a hook portion 72 respectively. The restoring mechanism is a spring 40 received in the spring room 71. The spring 40 is biased between the bottom of the spring room 71 and the piston 311. Each of the restriction members 50 is hollow. Two ends of the restriction member 50 are a connection portion 51 and an expansion portion 52 respectively. The connection portion 51 is hooked and fixed by the hook portion 72 of the abutting member 70. The expansion portion 52 includes a plurality of grooves spacedly arranged so that an end of the expansion portion 52 remote from the connection portion 51 is swingable when the piston member 31 slides axially. Thereby, the tool holder 80 can be selectively fixed or released. Preferably, an elastic ring 53 is sleeved onto the terminal end of the expansion portion 52 so that the expansion portion 52 tends to retract toward the blocking member 32.

The driving device 100 is disposed on the base 10. For example, the driving device 100 can include two driving motors and a coupling. The two driving motors are arranged at two sides of the coupling and are connected to the coupling respectively. The first pulley 200 and the second pulley 300 are connected to the coupling and the spindle body 20. The driving belt is arranged around the first pulley 200 and the second pulley 300 so that the spindle body 20 can be driven to rotate about the axial direction by the driving device 10 via the driving belt. The second pulley 300 is radially formed with two vent holes 301. The two vent holes 301 communicate the two gas inlets respectively and are adapted for the gas valve 60 to insert therein selectively. Preferably, the gas valve 60 is movable to insert into the vent hole 301 or to leave the vent hole 301.

Practically, during processing, the gas valve 60 has to leave the vent hole 301 to allow the second pulley 300 and the spindle body 20 to rotate. When removing the tool holder 80, the second pulley 300 is rotated to a specific position to make the vent hole 301 align the gas valve 60. Thereafter, the gas valve 60 is inserted into the vent hole 301 to inject gas into the vent hole 301 and the gas channel 21 so as to push the piston member 31 outward. Thereby, the restriction member 50 acquires a space for retracting inward so that the tool holder 80 is released from the restriction member 50. On the contrary, to fix the tool holder 80, the gas in the gas cavity 22 has to be discharged, and the piston member 31 retracts due to the spring 40. Thus, the restriction member 50 is expanded by the large-diameter portion of the blocking member 32, and the tool holder 80 is fixed by the restriction member 50.

In the present embodiment, the two vent holes 301 are arranged along the circumferential direction. To remove another tool holder, the second pulley 300 and the spindle body 20 have to be rotated to make another vent hole 301 align the gas valve for injecting gas into another gas cavity. However, in other possible embodiments, two gas valves can be arranged for the two vent holes. Thereby, the two vent holes can be arranged along the axial direction, and the two tool holders can be fixed or released at the same time. However, the circumferential arrangement of the two vent holes of the present embodiment helps reduce the volume along the axial direction and is able to make the spindle smaller.

It is noted that the vent holes 301 are formed on the pulley 300. Thus, the gas valve 60 and its related components can be received in the space enclosed by the driving belt. Thereby, the size of the spindle can be further reduced.

In conclusion, the spindle structure of the present invention has a smaller size and is capable of receiving two tool holders to improve the efficiency. Besides, the tool holder releasing mechanism is not exposed out of the spindle structure so that the size of the spindle structure can be minimized.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A spindle structure, including:
a base, defining an axial direction;
at least one spindle body, received in the base, rotatable in the base about the axial direction, the at least one spindle body being formed with at least one receiving room, wherein one end of the receiving room is a closed blind end and is formed with at least one gas channel, an opening of the at least one gas channel being formed on an outer face of the at least one spindle body and being defined as a gas inlet, an other end of the at least one receiving room, opposite the one end, being open and being adapted for a tool holder to insert therein;
at least one sliding member, received in the at least one receiving room, slidable along the axial direction, a piston and a driving portion each being arranged at a respective one of two ends of the at least one sliding member, the piston being closer to the blind end of the at least one receiving room than the driving portion is, a gas cavity being defined between the piston and the blind end of the at least one receiving room, the gas cavity communicating with the at least one gas channel;
at least one restoring mechanism, arranged in the at least one receiving room, providing an elastic force to the at least one sliding member in order to push the at least one sliding member to move toward the blind end of the at least one receiving room;
at least one restriction member, received in the at least one receiving room, connected to the driving portion of the at least one sliding member, the at least one restriction member being adapted for connecting to the tool holder to selectively prevent the tool holder from moving outward along the axial direction, the at least one restriction member being driven by the at least one sliding member to selectively deform between: (i) a fixation position at which the tool holder is secured, and (ii) a release position at which the tool holder is released; and
a gas valve, disposed on the base, and configured to selectively communicate with the gas inlet, the gas valve being adapted for connecting to a gas source in order to inject gas into the gas cavity via the at least one gas channel so that the at least one sliding member is pushed to slide outward along the axial direction, to thereby drive the restriction member to deform from the fixation position to the release position.

2. The spindle structure of claim 1, further including a driving device, a first pulley, a second pulley, and a driving belt, the driving device being disposed on the base, the first pulley and the second pulley being sleeved onto the driving device and the at least one spindle body respectively, the driving belt being arranged around the first pulley and the second pulley so that the at least one spindle body is driven to rotate about the axial direction by the driving device via the driving belt, the second pulley being radially formed with at least one vent hole, the at least one vent hole communicating with the gas inlet and being adapted for the gas valve to selectively insert therein.

3. The spindle structure of claim 2, wherein the at least one sliding member includes a piston member and a driving member, the piston member and the driving member are connected together, the piston is located at an end of the piston member remote from the driving member, the driving member has said driving portion, an outer diameter of the driving member reduces from an end remote from the piston member toward an end closer to the piston member, an abutting member is sleeved onto the piston member, an outer surface of the abutting member is fixed to an inner wall of the at least one receiving room, a spring room and a hook portion are each formed at a respective one of two opposite ends of the abutting member, the at least one restoring mechanism is a spring received in the spring room to be biased between a bottom of the spring room and the piston, the at least one restriction member is hollow, the at least one restriction member comprises a connection portion at one end thereof and an expansion portion at another end thereof, the connection portion is hooked and is fixed by the hook portion of the abutting member, and the expansion portion has a plurality of grooves arranged spacedly so that an end of the expansion portion remote from the connection portion is radially swingable to selectively fix or release the tool holder when the piston member slides axially.

4. The spindle structure of claim 2, wherein the driving device includes two driving motors.

5. The spindle structure of claim 1, wherein the at least one sliding member includes a piston member and a driving member, the piston member and the driving member are connected together, the piston is located at an end of the piston member remote from the driving member, the driving member has said driving portion, an outer diameter of the driving member reduces from an end remote from the piston member toward an end closer to the piston member, an abutting member is sleeved onto the piston member, an outer surface of the abutting member is fixed to an inner wall of the at least one receiving room, a spring room and a hook portion are each formed at a respective one of two opposite ends of the abutting member, the at least one restoring mechanism is a spring received in the spring room to be biased between a bottom of the spring room and the piston, the at least one restriction member is hollow, the at least one restriction member comprises a connection portion at one end thereof and an expansion portion at another end thereof, the connection portion is hooked and is fixed by the hook portion of the abutting member, and the expansion portion has a plurality of grooves arranged spacedly so that an end of the expansion portion remote from the connection portion is radially swingable to selectively fix or release the tool holder when the piston member slides axially.

6. The spindle structure of claim 5, wherein an elastic ring is sleeved onto a terminal end of the expansion portion of the at least one restriction member so that the expansion portion tends to retract toward the driving member.

7. A spindle structure, including:
a base, defining an axial direction;
a spindle body received in the base, rotatable in the base about the axial direction, the spindle body being formed at a first end with a first receiving room and being formed at a second opposite end with a second receiving room, wherein an end of the first receiving room is a closed blind end and is formed with at least one first gas channel that communicates with the first receiving room, an opening of the at least one first gas channel being formed on an outer face of the spindle body and being defined as a first gas inlet, an other end of the first receiving room being open and being adapted for a first tool holder to insert therein, wherein an end of the second receiving room is a closed blind end and is formed with at least one second gas channel that communicates with the second receiving room, an opening of the at least one second gas channel being formed on an outer face of the spindle body and being defined as a second gas inlet, an other end of the second receiving room being open and being adapted for a second tool holder to insert therein;

a first sliding member, received in the first receiving room, slidable along the axial direction, a first piston and a first driving portion each being arranged at a respective one of two ends of the first sliding member, the first piston being closer to the blind end of the first receiving room than the first driving portion is, a first gas cavity being defined between the first piston and the blind end of the first receiving room, the first gas cavity communicating with the at least one first gas channel;

a second sliding member, received in the second-receiving room, slidable along the axial direction, a second piston and a second driving portion each being arranged at a respective one of two ends of the second sliding member, the second piston being closer to the blind end of the second receiving room than the second driving portion is, a second gas cavity being defined between the second piston and the blind end of the second receiving room, the second gas cavity communicating with the at least one second gas channel;

a first restoring mechanism, arranged in the first receiving room, providing an elastic force to the first sliding member in order to push the first sliding member to move toward the blind end of the first receiving room;

a second restoring mechanism, arranged in the second receiving room, providing an elastic force to the second sliding member in order to push the second sliding member to move toward the blind end of the second receiving room;

a first restriction member, received in the first receiving room, connected to the first driving portion of the first sliding member, the first restriction member being adapted for connecting to the first tool holder to selectively prevent the first tool holder from moving outward along the axial direction, the first restriction member being driven by the first sliding member to selectively deform between: (i) a fixation position at which the first tool holder is secured, and (ii) a release position at which the first tool holder is released;

a second restriction member, received in the second receiving room, connected to the second driving portion of the second sliding member, the second restriction member being adapted for connecting to the second tool holder to selectively prevent the second tool holder from moving outward along the axial direction, the second restriction member being driven by the second sliding member to selectively deform between: (i) a fixation position at which the second tool holder is secured, and (ii) a release position at which the second tool holder is released; and a gas valve, disposed on the base, and configured to selectively communicate with the first gas inlet and the second gas inlet, the gas valve being adapted for connecting to a gas source in order to inject gas into the first gas cavity via the first gas channel so that the first sliding member is pushed to slide outward along the axial direction, to thereby drive the first restriction member to deform from the fixation position of the first restriction member to the release position of the first restriction member, the gas valve also being configured to selectively inject gas into the second gas cavity via the second gas channel so that the second sliding member is pushed to slide outward along the axial direction to thereby drive the second restriction member to deform from the fixation position of the second restriction member to the release position of the second restriction member.

8. The spindle structure of claim 7, wherein the first gas inlet and the second gas inlet are spacedly arranged along a circumferential direction of the spindle body, and wherein the first gas channel includes a first radial section, an axial section, and a second radial section, wherein the axial section connects the first radial section and the second radial section, wherein the first radial section is connected to the first gas inlet, and wherein the second radial section is connected to the first gas cavity, and wherein the second gas channel includes a first radial section, an axial section, and a second radial section, wherein the axial section of the second gas channel connects the second gas channel first radial section and the second gas channel second radial section, wherein the second gas channel first radial section is connected to the second gas inlet, and wherein the second gas channel second radial section is connected to the second gas cavity.

9. The spindle structure of claim 8, wherein the first sliding member includes a first piston member and a first driving member, the first piston member and the first driving member are connected together, the first piston is located at an end of the first piston member remote from the first driving member, the first driving member has said first driving portion, an outer diameter of the first driving member reduces from an end remote from the first piston member toward an end closer to the first piston member, a first abutting member is sleeved onto the first piston member, an outer surface of the first abutting member is fixed to an inner wall of the first receiving room, a first spring room and a first hook portion are each formed at a respective one of two opposite ends of the first abutting member, the first restoring mechanism is a spring received in the first spring room to be biased between a bottom of the first spring room and the first piston, the first restriction member is hollow, first restriction member comprises a connection portion at one end thereof and an expansion portion at another end thereof, the connection portion is hooked and is fixed by the first hook portion of the first abutting member, and the expansion portion has a plurality of grooves arranged spacedly so that an end of the expansion portion remote from the connection portion is radially swingable to selectively fix or release the first tool holder when the first piston member slides axially.

10. The spindle structure of claim 7, further including a driving device, a first pulley, a second pulley, and a driving belt, the driving device being disposed on the base, the first pulley and the second pulley being sleeved onto the driving device and the spindle body respectively, the driving belt being arranged around the first pulley and the second pulley so that the spindle body is driven to rotate about the axial direction by the driving device via the driving belt, the second pulley being radially formed with two vent holes, each of the two vent holes communicating with one of the first gas inlet and the second gas inlet and being adapted for the gas valve to selectively insert therein.

11. The spindle structure of claim 10, wherein the first sliding member includes a first piston member and a first driving member, the first piston member and the first driving member are connected together, the first piston is located at an end of the first piston member remote from the first driving member, the first driving member has said first driving portion, an outer diameter of the first driving member reduces from an end remote from the first piston member toward an end closer to the first piston member, a first abutting member is sleeved onto the first piston member, an outer surface of the first abutting member is fixed to an inner wall of the first receiving room, a first spring room and a first hook portion are each formed at a respective one of two opposite ends of the first abutting member, the first restoring mechanism is a spring received in the first spring room to be biased between a bottom of the first spring room and the first piston, the first restriction member is hollow, the first restriction member comprises a connection portion at one end thereof and an expansion portion at another end thereof, the connection portion is hooked and is fixed by the first hook portion of the first abutting member, and the expansion portion has a plurality of grooves arranged spacedly so that an end of the expansion portion remote from the connection portion is radially swingable to selectively fix or release the first tool holder when the first piston member slides axially.

12. The spindle structure of claim 10, wherein the driving device includes two driving motors.

13. The spindle structure of claim 7, wherein the first sliding member includes a first piston member and a first driving member, the first piston member and the first driving member are connected together, the first piston is located at an end of the first piston member remote from the first driving member, the first driving member has said first driving portion, an outer diameter of the first driving member reduces from an end remote from the first piston member toward an end closer to the first piston member, a first abutting member is sleeved onto the first piston member, an outer surface of the first abutting member is fixed to an inner wall of the first receiving room, a first spring room and a first hook portion are each formed at a respective one of two opposite ends of the first abutting member, the first restoring mechanism is a spring received in the first spring room to be biased between a bottom of the first spring room and the first piston, the first restriction member is hollow, the first restriction member comprises a connection portion at one end thereof and an expansion portion at another end thereof, the connection portion is hooked and is fixed by the first hook portion of the first abutting member, and the expansion portion has a plurality of grooves arranged spacedly so that an end of the expansion portion remote from the connection portion is radially swingable to selectively fix or release the first tool holder when the first piston member slides axially.

14. The spindle structure of claim 13, wherein the second sliding member includes a second piston member and a second driving member, the second piston member and the second driving member are connected together, the second piston is located at an end of the second piston member remote from the second driving member, the second driving member has said second driving portion, an outer diameter of the second driving member reduces from an end remote from the second piston member toward an end closer to the second piston member, a second abutting member is sleeved onto the second piston member, an outer surface of the second abutting member is fixed to an inner wall of the second receiving room, a second spring room and a second hook portion are each formed at a respective one of two opposite ends of the second abutting member, the second restoring mechanism is a spring received in the second spring room to be biased between a bottom of the second spring room and the second piston, the second-restriction member is hollow, the second restriction member comprises a connection portion at one end thereof and an expansion portion at another end thereof, the connection portion of the second restriction member is hooked and is fixed by the second hook portion of the second abutting member, and the expansion portion of the second restriction portion has a plurality of grooves arranged spacedly so that an end of the second restriction portion expansion portion remote from the second restriction portion connection portion is radially swingable to selectively fix or release the second tool holder when the second piston member slides axially.

15. The spindle structure of claim 7, wherein the first receiving room and the second receiving room open toward opposite directions.

* * * * *